(12) United States Patent
Geyer

(10) Patent No.: US 8,240,134 B2
(45) Date of Patent: Aug. 14, 2012

(54) ENGINE WITH EXHAUST COOLING AND METHOD

(75) Inventor: Stephen Geyer, State Line, PA (US)

(73) Assignee: Mack Trucks, Inc., Greensboro, NC (US)

(*) Notice: Subject to any disclaimer, the term of this patent is extended or adjusted under 35 U.S.C. 154(b) by 456 days.

(21) Appl. No.: 12/515,290

(22) PCT Filed: Dec. 5, 2006

(86) PCT No.: PCT/US2006/046193
§ 371 (c)(1),
(2), (4) Date: May 18, 2009

(87) PCT Pub. No.: WO2008/069780
PCT Pub. Date: Jun. 12, 2008

(65) Prior Publication Data
US 2010/0043407 A1  Feb. 25, 2010

(51) Int. Cl.
F01N 3/00 (2006.01)

(52) U.S. Cl. ........ 60/286; 60/274; 60/287; 60/293; 60/298; 60/320

(58) Field of Classification Search .......... 60/274, 60/277, 289, 290, 293, 297, 298, 301, 307, 60/320
See application file for complete search history.

(56) References Cited

U.S. PATENT DOCUMENTS

| | | | |
|---|---|---|---|
| 3,947,544 A * | 3/1976 | Yamada et al. | 423/212 |
| 3,967,929 A * | 7/1976 | Tamazawa et al. | 422/109 |
| 5,184,462 A | 2/1993 | Schatz | |
| 5,581,997 A * | 12/1996 | Janes | 60/39.12 |
| 5,605,042 A | 2/1997 | Stutzenberger | |
| 5,628,186 A * | 5/1997 | Schmelz | 60/274 |
| 5,753,188 A | 5/1998 | Shimoda et al. | |
| 5,845,487 A | 12/1998 | Fraenkle et al. | |
| 5,930,995 A | 8/1999 | Watanabe et al. | |
| 6,125,629 A * | 10/2000 | Patchett | 60/286 |
| 6,192,677 B1 | 2/2001 | Tost | |
| 6,347,511 B1 | 2/2002 | Haines | |
| 6,422,007 B1 | 7/2002 | Hartick | |
| 6,799,422 B2 * | 10/2004 | Westerbeke et al. | 60/289 |
| 6,871,489 B2 * | 3/2005 | Tumati et al. | 60/285 |
| 7,065,958 B2 * | 6/2006 | Funk et al. | 60/286 |
| 7,669,411 B2 * | 3/2010 | Mallampalli et al. | 60/298 |
| 7,673,447 B2 * | 3/2010 | Gaiser | 60/289 |

(Continued)

FOREIGN PATENT DOCUMENTS

EP  1630369 A2  3/2006

(Continued)

OTHER PUBLICATIONS

Japanese Offical Action in corresponding Japanese Application 2009-540211 (with translation).

(Continued)

Primary Examiner — Binh Q Tran
Assistant Examiner — Jesse Bogue
(74) Attorney, Agent, or Firm — WRB-IP LLP

(57) ABSTRACT

An engine arrangement includes an engine, an exhaust line downstream of the engine, an aftertreatment device in the exhaust line, and a conduit between a source of fluid and a point in the exhaust line upstream of the aftertreatment device. A method is also disclosed.

19 Claims, 2 Drawing Sheets

U.S. PATENT DOCUMENTS

| | | | |
|---|---|---|---|
| 2003/0212484 A1* | 11/2003 | Takebayashi et al. | 701/114 |
| 2004/0098973 A1 | 5/2004 | Tennison et al. | |
| 2004/0120874 A1* | 6/2004 | Zauderer | 423/242.1 |
| 2004/0206069 A1 | 10/2004 | Tumati et al. | |
| 2005/0069476 A1* | 3/2005 | Blakeman et al. | 423/239.1 |
| 2006/0162325 A1* | 7/2006 | Darley et al. | 60/317 |

FOREIGN PATENT DOCUMENTS

| | | |
|---|---|---|
| JP | 9032540 | 2/1997 |
| JP | 2005036770 | 2/2005 |

OTHER PUBLICATIONS

International Search Report for corresponding International Application PCT/US2006/046193.

Supplementary European Search Report for corresponding EP 06 83 8903, Search Report Date: Apr. 8, 2010.

* cited by examiner

ENGINE WITH EXHAUST COOLING AND METHOD

BACKGROUND AND SUMMARY

The present invention relates to engine exhaust systems and, more particularly, to engine exhaust systems having exhaust cooling.

In many modern vehicles, such those including diesel engines, exhaust aftertreatment devices such as diesel particulate filters (DPF), selective catalytic reduction catalysts (SCR), and NOx traps are provided in the exhaust line downstream of the engine. Devices such as the SCR and NOx traps are typically disposed downstream of the DPF. It is periodically necessary to regenerate the DPF, which usually involves burning fuel upstream of the DPF to raise the temperature of the gas passing through the DPF to temperatures that are potentially harmful to other devices. To avoid damage to the downstream devices, it is customary today to control the temperature of the gas passing through the DPF, such as by reducing the amount of fuel burned to regenerate the DPF. Nonetheless, it is still possible to generate excess heat which can damage the downstream devices.

It is desirable to provide an apparatus and method that can reduce the potential for damage to aftertreatment devices downstream of a DPF.

According to an aspect of the present invention, an engine arrangement comprises an engine, an exhaust line downstream of the engine, an aftertreatment device in the exhaust line, and a conduit between a source of fluid and a point in the exhaust line upstream of the aftertreatment device.

According to another aspect of the present invention, a method of controlling temperature in an exhaust line is provided. According to the method, exhaust temperature in an exhaust line is measured at a point upstream of an aftertreatment device. A signal is sent to a controller corresponding to the measured temperature. Air is introduced to the exhaust line at or upstream from the measuring point under control of the controller as a function of the measured temperature.

BRIEF DESCRIPTION OF THE DRAWINGS

The invention is described in connection with a preferred embodiment shown in the following drawings in which.

DETAILED DESCRIPTION

Figure 1:
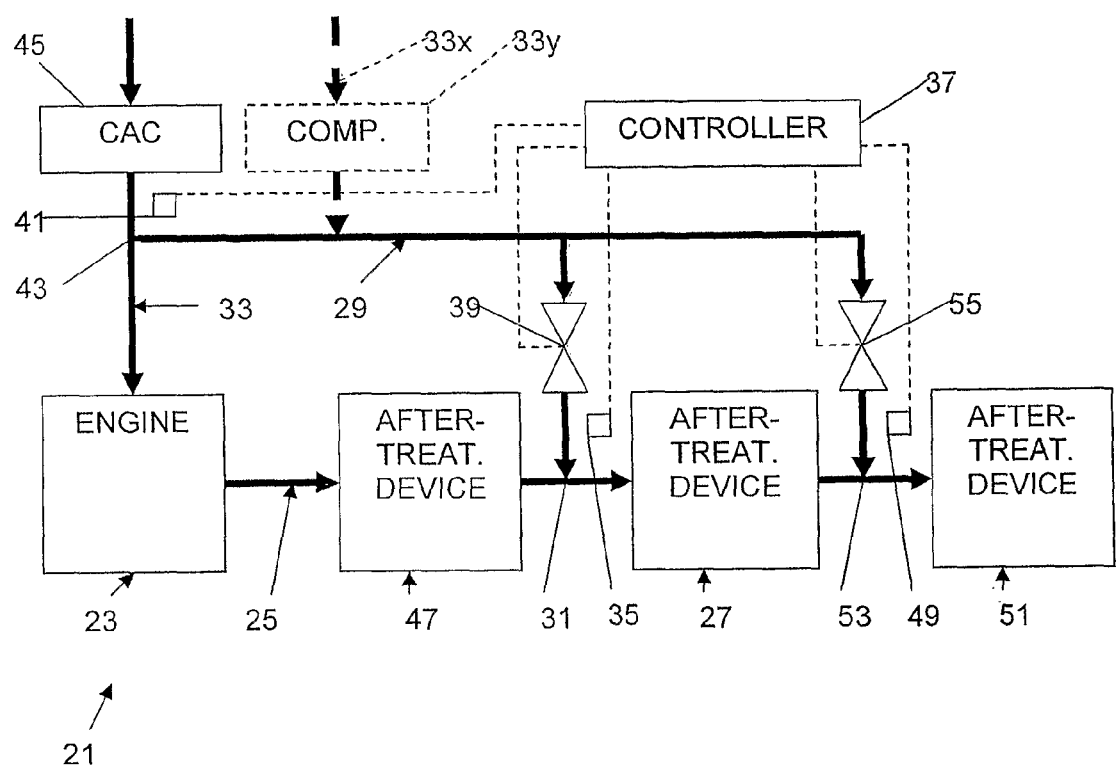
FIG. 1 is a block diagram showing an engine with exhaust cooling according to an embodiment of the present invention.

FIG. 1 shows an engine arrangement 21 according to an embodiment of the present invention. The engine arrangement 21 comprises an engine 23 and an exhaust line 25 downstream of the engine. An aftertreatment device 27 is provided in the exhaust line 25. A conduit 29 extends between a source of fluid and a point 31 in the exhaust line 25 upstream of the aftertreatment device 27.

Figure 2:
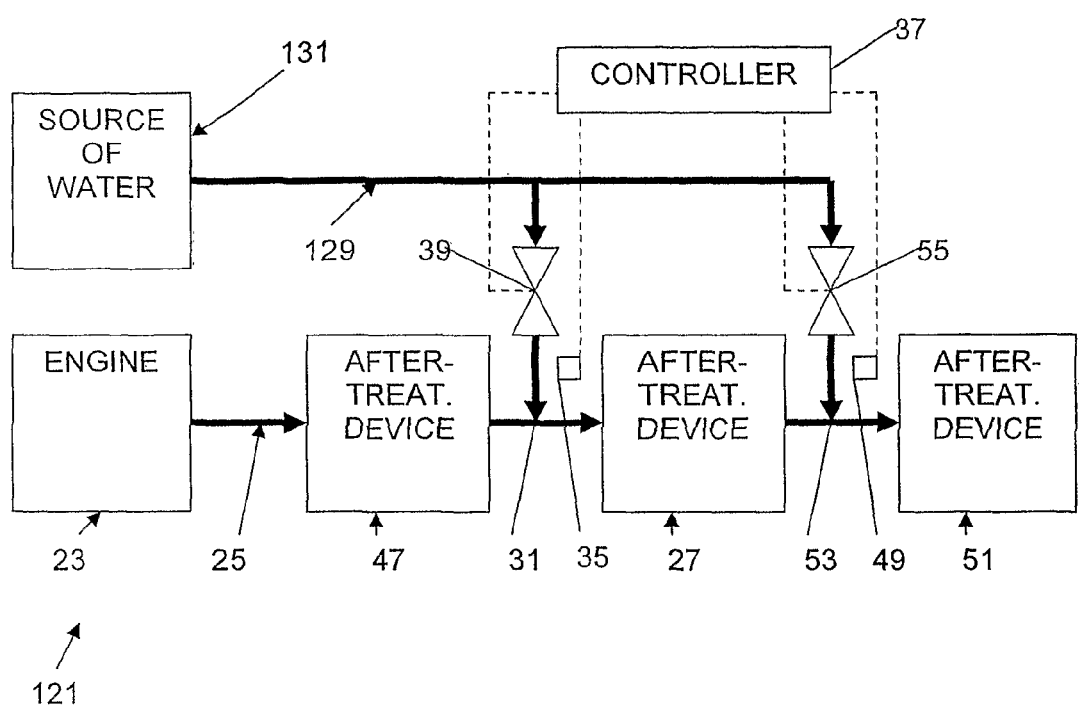
FIG. 2 is a block diagram showing an engine with exhaust cooling according to an embodiment of the present invention.

The source of fluid is ordinarily an intake line 33 upstream of the engine 23, however, it will be appreciated that fluid can be introduced from a variety of sources, such as pressurized air that is not combustion air. Also, as seen in FIG. 2, an aspect of the engine arrangement 121 may involve introduction of fluid from a source of fluid such as a source of water 131 through a conduit 129. The engine arrangement 121 can be used instead of or in combination with the engine arrangement 21 shown in FIG. 1. FIG. 1 shows, in phantom, a source of fluid that comprises a line 33x that may be draw atmospheric air, for example, together with a compressor 33y for pressurizing the air to a pressure sufficient to permit it to be introduced to the exhaust line 25. This source of fluid may be a vehicle's compressed air system, such as the system that is used for braking in trucks. For purposes of discussion, an embodiment wherein the source of fluid comprises the intake line 33 will be described.

A temperature sensor 35 can be provided proximate the point 31 in the exhaust line 25. A controller 37 can be provided for receiving a signal from the temperature sensor 35. A valve 39 can be provided in the conduit 29. The valve 39 will ordinarily be controlled by the controller 37 in response to the signal from the temperature sensor 35. The valve 39 can be a proportional valve of the type adapted to be controlled by the controller 37 to open to any of a plurality of positions between fully open and fully closed in response to the signal from the temperature controller. The valve 39 may, of course, be of the on/off type, e.g., a solenoid valve, that is either fully open or fully closed. Introduced air can be introduced continuously or in a series of pulses until a desired temperature is reached.

A second temperature sensor 41 can be provided proximate a point 43 where the conduit 29 connects to intake line 33. The controller 37 can receive a temperature signal from the second temperature sensor 41, and the controller can control the valve 39 as a function of the signal from the first temperature sensor 33 and the signal from the second temperature sensor 41. A charge air cooler (CAC) 45 is often provided in the intake line 33. The conduit 29 is typically connected to the intake line 33 downstream of the CAC 45 to take advantage of the cooler air downstream of the CAC. It will be appreciated, however, that air upstream of the CAC can be used to cool the exhaust.

An upstream aftertreatment device 47 can be provided upstream of the aftertreatment device 27. The point 31 in the exhaust line 25 can be disposed between the upstream aftertreatment device 47 and the aftertreatment device 27. In an embodiment that is presently contemplated, the upstream aftertreatment device 47 is a DPF, and the downstream aftertreatment device 27 is at least one of a DPF, a NOx trap, and an SCR. As regeneration of the DPF typically requires temperatures that are higher than normal operating temperatures, cooling of the exhaust downstream of the DPF by introducing air to the exhaust can reduce the possibility of damage to equipment such as an SCR or a NOx trap. When air is introduced from the intake line 33, it is presently contemplated that approximately 10-15% of charge air will be diverted to the conduit 29 for introduction to the exhaust line 25.

In a method of controlling temperature in an exhaust line 25 according to an aspect of the present invention, exhaust temperature is measured in the exhaust line at a point 31 upstream of an aftertreatment device 27. A signal is sent to a controller 37 corresponding to the measured temperature. Air is introduced to the exhaust line 25 at or upstream from the measuring point 31 under control of the controller 37 as a function of the measured temperature.

The method can also comprise measuring a temperature of the air introduced to the exhaust line 25, e.g., via the second temperature sensor 41 proximate the point 43 in the intake line 33. A signal is sent to the controller 37 corresponding to the measured introduced air temperature, and introduction of air to the exhaust line 25 is controlled by the controller 37 as a function of the measured temperature and the measured introduced air temperature.

A particularly beneficial use for an aspect of the present invention is in connection with cooling of exhaust from an upstream aftertreatment device 47 such as a DPF that is upstream of an aftertreatment device 27 such as an SCR or an NOx trap when the temperature of the exhaust at the upstream aftertreatment device is raised from a normal operating temperature. This may occur when, for example, a regeneration procedure is performed for the DPF which necessitates raising the upstream temperature from the normal operating temperature.

The method can comprise measuring a second exhaust temperature in the exhaust line 25 with a temperature sensor 49 at a second point upstream of a second aftertreatment device 51. The temperature sensor 49 can send a signal to the controller 37 corresponding to the second measured temperature. Air can be introduced to the exhaust line 25 at a point 53 at or upstream from the temperature sensor 49 under control of the controller 37 as a function of the second measured temperature. The amount of air introduced can be controlled using a valve 55 that can be of ally desired type, but will ordinarily be of the same type used for the valve 39.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention must not be regarded as being limited to the exemplary embodiments described above, a number of further variants and modifications being feasible without departing from the scope of the following claims.

What is claimed is:

1. An engine arrangement, comprising:
   an engine;
   an exhaust line downstream of the engine;
   an aftertreatment device in the exhaust line;
   an upstream device upstream of the aftertreatment device;
   a conduit between a source of cooling fluid and a point in the exhaust line upstream of the aftertreatment device and disposed between the upstream device and the aftertreatment device;
   a temperature sensor proximate the point in the exhaust line;
   a controller for receiving a signal from the temperature sensor;
   a valve in the conduit, the valve being controlled by the controller in response to the signal from the temperature sensor for selective introduction of cooling fluid into the exhaust line; and
   a second temperature sensor proximate a point where the conduit connects to the source of fluid, the controller receiving a signal from the second temperature sensor, the controller controlling the valve as a function of the signal from the first temperature sensor and the signal from the second temperature sensor,
   wherein the aftertreatment device comprises an SCR arranged to be operated within a predetermined range of temperatures, the upstream device is adapted to at least occasionally operate at a temperature greater than an upper temperature of the range of temperatures, and the valve is controlled by the controller to introduce cooling fluid into the exhaust when the upstream device is operated at or above the upper temperature.

2. The engine arrangement as set forth in claim 1, wherein the controller is adapted to control the valve to open to a plurality of positions between fully open and fully closed in response to the signal from the temperature controller.

3. The engine arrangement as set forth in claim 2, comprising a second temperature sensor proximate a point where the conduit connects to the source of fluid, the controller receiving a signal from the second temperature sensor, the controller controlling the valve as a function of the signal from the first temperature sensor and the signal from the second temperature sensor.

4. The engine arrangement as set forth in claim 3, wherein the controller is adapted to control the valve to open to a plurality of positions between fully open and fully closed in response to the signal from the temperature controller.

5. The engine arrangement as set forth in claim 1, wherein the controller is adapted to control the valve to open to a plurality of positions between fully open and fully closed in response to the signal from the temperature controller.

6. The engine arrangement as set forth in claim 1, wherein the source of fluid comprises an air intake line upstream of and leading to the engine.

7. The engine arrangement as set forth in claim 6, comprising a charge air cooler in the intake line, the conduit being connected to the intake line downstream of the charge air cooler.

8. The engine arrangement as set forth in claim 1, wherein the source of fluid comprises a compressor.

9. The engine arrangement as set forth in claim 1, wherein the upstream device comprises an upstream aftertreatment device upstream of the aftertreatment device, the point in the exhaust line being disposed between the upstream aftertreatment device and the aftertreatment device.

10. The engine arrangement as set forth in claim 9, wherein the upstream aftertreatment device is a DPF.

11. The engine arrangement as set forth in claim 1, wherein the source of fluid comprises a source of water.

12. The engine arrangement as set forth in claim 1, wherein the source of fluid comprises a compressor of a turbocharger of the engine.

13. A method of controlling temperature in an exhaust line, comprising:
    measuring exhaust temperature in an exhaust line at a point upstream of an aftertreatment device, the aftertreatment device comprising an SCR operable within a predetermined range of temperatures;
    operating a device upstream of the aftertreatment device at a temperature above an upper temperature of the range of temperatures;
    sending a signal to a controller corresponding to the measured temperature;
    introducing a cooling fluid to the exhaust line at or upstream from the measuring point when the upstream device is operated at the temperature at or above the upper temperature by controlling a valve with the controller as a function of the measured temperature, the valve being disposed in a line between the exhaust line and a source of the cooling fluid;
    measuring a temperature of the fluid introduced to the exhaust line, sending a signal to the controller corresponding to the measured introduced fluid temperature, and
    controlling introduction of fluid to the exhaust line as a function of the measured temperature and the measured introduced fluid temperature.

14. The method of controlling temperature in the exhaust line as set forth in claim 13, wherein the upstream device is an upstream aftertreatment device, the method comprising introducing exhaust to the upstream aftertreatment device upstream of the aftertreatment device at an upstream temperature and raising the upstream temperature.

15. The method of controlling temperature in the exhaust line as set forth in claim 13, comprising measuring a second exhaust temperature in the exhaust line at a second point upstream of a second aftertreatment device, sending a signal to the controller corresponding to the second measured temperature, and introducing fluid to the exhaust line at or upstream from the second measuring point under control of the controller as a function of the second measured temperature.

16. The method of controlling temperature in the exhaust line as set forth in claim 13, wherein the exhaust line is connected downstream of an engine and an intake line is connected upstream of the engine, comprising introducing between 10-15% of intake fluid to the exhaust line.

17. The method of controlling temperature in the exhaust line as set forth in claim 13, comprising introducing the cooling fluid by withdrawing the cooling fluid from a compressor of a turbocharger of an engine that exhausts into the exhaust line.

18. An engine arrangement, comprising:
an engine;
an exhaust line downstream of the engine;
an aftertreatment device in the exhaust line;
a DPF upstream of the aftertreatment device;
a conduit between a source of cooling fluid and a point in the exhaust line upstream of the aftertreatment device, the point in the exhaust line being disposed between the DPF and the aftertreatment device;
a first temperature sensor proximate the point in the exhaust line;
a second temperature sensor proximate a point where the conduit connects to the source of fluid;
a controller for receiving a signal from the first temperature sensor and a signal from the second temperature sensor and controlling the valve as a function of the signal from the first temperature sensor and the signal from the second temperature sensor; and
a valve in the conduit, the valve being controlled by the controller in response to the signal from the temperature sensor for selective introduction of cooling fluid into the exhaust line,
wherein the aftertreatment device comprises an SCR.

19. The engine arrangement as set forth in claim 18, wherein the source of fluid comprises a compressor of a turbocharger of the engine.

* * * * *